United States Patent
Tanaka et al.

(10) Patent No.: US 6,705,905 B1
(45) Date of Patent: Mar. 16, 2004

(54) SEA-LAND-SKY CRAFT

(76) Inventors: Akio Tanaka, 2174 Ao-cho, Ono-City, Hyogo-prefecture (JP), 675-1358; Chiyoko Tanaka, 217 Ao-cho, Ono-City, Hyogo-prefecture (JP), 675-1358; Masato Tanaka, 402-Gloria-Hatsuho Gotenyama, 5-7-14 Kitasinagawa, Shinagawa-ku, Tokyo (JP), 141-0001; Sojuro Nakajima, 9-22, 2-Chome, Takenodai, Nishi-ku, Kobe-city, Hyogo-prefecture (JP), 651-2274; Chitose Nakajima, 9-22, 2-Chome, Takenodai, Nishi-ku, Kobe-city, Hyogo-prefecture (JP), 651-2274; Shum Nakajima, 9-22, 2-Chome, Takenodai, Nishi-ku, Kobe-city, Hyogo-prefecture (JP), 651-2274; Ken Nakajima, 9-22, 2-Chome, Takenodai, Nishi-ku, Kobe-city, Hyogo-prefecture 651-2274 (JP); Risaburo Endo, 33-22, 1 Chome, Fujigaoka, Akashi-city, Hyogo-prefecture 673-0046 (JP); Kazuo Watanabe, 2-6, 5-Chome, Takenodai, Nishi-ku, Kobe-city, Hyogo-prefecture 641-2274 (JP); Tsuneo Sugimori, 32, 6-Chome, Fujigaoka, Takarazuka-city, Hyogo-prefecture 665-0806 (JP)

( * ) Notice: Subject to any disclaimer, the term of this patent is extended or adjusted under 35 U.S.C. 154(b) by 0 days.

(21) Appl. No.: 10/262,090

(22) Filed: Oct. 1, 2002

(51) Int. Cl.[7] .................................................. B60F 3/00
(52) U.S. Cl. .............................. 440/12.51; 244/17.11; 244/50
(58) Field of Search ...................... 440/12.5; 244/17.11, 244/13, 50

(56) References Cited

U.S. PATENT DOCUMENTS

| | | | | |
|---|---|---|---|---|
| 4,899,954 | A | * | 2/1990 | Pruszenski, Jr. ............... 244/2 |
| 5,909,857 | A | * | 6/1999 | Filimonov .................... 244/29 |
| 6,517,026 | B1 | * | 2/2003 | Smith ........................... 244/2 |
| 6,619,584 | B1 | * | 9/2003 | Haynes ......................... 244/2 |
| 2001/0045492 | A1 | * | 11/2001 | Lewis .......................... 244/13 |
| 2002/0125367 | A1 | * | 9/2002 | Killingsworth .......... 244/17.11 |

* cited by examiner

*Primary Examiner*—Stephen Avila

(57) ABSTRACT

A sea-land-sky craft capable of navigating on the water, running on the land and flying in the air (that is, climbing vertically, flying horizontally and hovering in the air) usable in a new transportation system 1. The sea-land-sky craft comprises rotating wings rotatable in opposite directions on their centers. Mounting shafts are disposed at positions eccentric to the centers of the rotating wings and mount the rotating wings so that the orientation of the rotating wings can be turned. A cylindrical duct encloses the outer circumferences of the maximum diameters of the rotations of the rotating wings. A fuselage is located at a central portion of the craft. Movable struts are provided for connecting the cylindrical duct and the fuselage. In the sea-land-sky craft, the cylindrical duct is deformed into a fixed wing by the actions of the movable struts.

5 Claims, 6 Drawing Sheets

SEA-LAND-SKY CRAFT

BACKGROUND OF THE INVENTION

1. Field of the Invention

The present invention relates to a novel sea-land-sky craft capable of climbing vertically, flying horizontally, hovering in the air, running on the ground and navigating on the water while interchanging these individual functions simply and reliably.

2. Background of the Invention

As the flying system having the three functions of climbing vertically, flying horizontally and hovering in the air, the rotorcraft (here called the "helicopter"), the vertical take-off and landing (as will be called the "VTOL") fixed-wing craft and so on are known not only to those skilled in the art but also widely in the world. However, these crafts have the following many problems.

The helicopter of the prior art has high efficiencies for climbing vertically and hovering in the air but has a problem that the efficiency for flying horizontally is extremely poor. On the contrary, the VTOL of the prior art has high efficiencies for flying horizontally but has a problem that the efficiencies for climbing vertically and hovering in the air are extremely poor. In addition, both of these have serious defects that they are so unstable maintaining position in the air that they easily turn over and are more difficult to maneuver than the ordinary fixed-wing craft and are highly prone to turning over or dropping. Moreover, the helicopter and the VTOL of the prior art cannot run on a road or waterway of a small width and require a road as wide as a runway or a waterway as wide as a large river.

SUMMARY OF THE INVENTION

An object of the present invention is to provide an improved small-sized inexpensive sea-land-sky craft which not only can solve all the individual problems, difficulties, defects and restrictions of the aforementioned helicopter and VTOL of the prior art but also is highly efficient in all the functions to climb vertically, fly horizontally, hover in the air, run on the road and navigate on the waterway and able to interchange those individual functions safely, reliably and easily.

In order to achieve the above-specified object, the sea-land-sky craft of the invention improves the flying efficiency while climbing vertically and hovering in the air by disposing a cylindrical duct by the outer periphery of the rotors. At the horizontally flying time, the propelling efficiency is enhanced by inclining the fuselage forward by 90 degrees and by changing the diameters and the angles of incidence of the rotors. At the same time, the shape of the duct enclosing the rotors is changed from a cylindrical shape into an elliptical cylinder wing or a straight line wing to deform the craft into an airplane having a similar shape as an ordinary one having fixed main wings, thereby to improve the flying efficiency for a horizontal flight drastically. At the same time, the shape of the cylindrical duct having a large diameter is changed into an elliptical cylinder rotor of a shorter diameter or a straight line wing of a small width, and the craft may run or navigate in the longer diameter direction of the elliptical cylinder rotor or in the longitudinal direction of the straight line wing even on a narrow road or waterway so that it may reach a destination easily.

An aspect of the present invention resides in a sea-land-sky craft which comprises rotating wings rotatable in opposite directions on their centers. Mounting shafts are disposed at positions eccentric to the centers of the rotating wings and mount the rotating wings so that the orientation of the rotating wings can be turned. A cylindrical duct encloses the outer circumferences of the maximum diameters of the rotations of the rotating wings. A fuselage is located at a central portion of the craft. Movable struts are provided for connecting the cylindrical duct and the fuselage. In the sea-land-sky craft, the cylindrical duct is deformed into a fixed wing by the actions of the movable struts.

DETAILED DESCRIPTION OF THE INVENTION

According to the present invention, a sea-land-sky craft which comprises rotating wings rotatable in opposite directions on their centers. Mounting shafts are disposed at positions eccentric to the centers of the rotating wings and mount the rotating wings so that the orientation of the rotating wings can be turned. A cylindrical duct encloses the outer circumferences of the maximum diameters of the rotations of the rotating wings. A fuselage is located at a central portion of the craft. Movable struts are provided for connecting the cylindrical duct and the fuselage. In the sea-land-sky craft, the cylindrical duct is deformed into a fixed wing by the actions of the movable struts.

Figure 1:
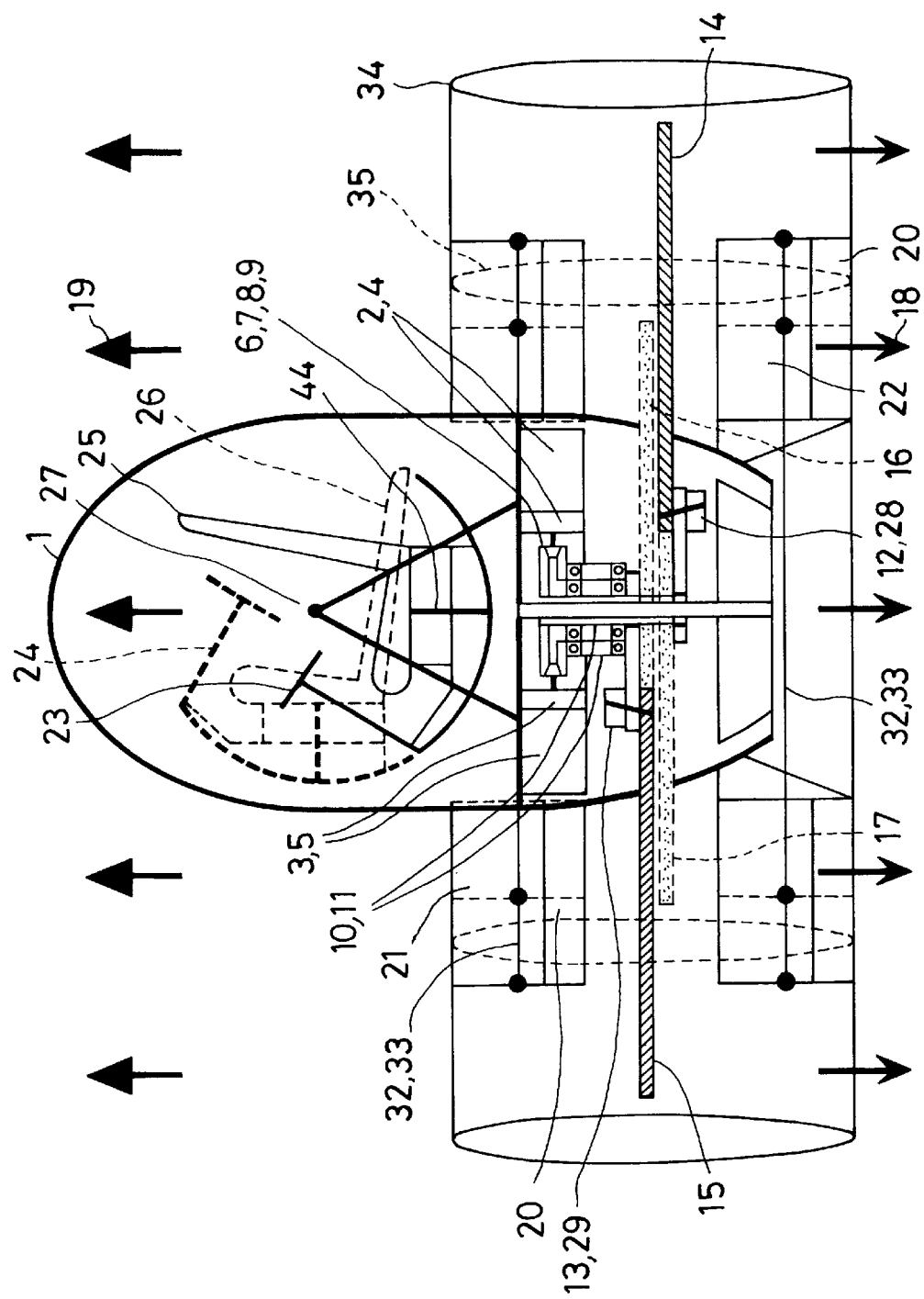
FIG. 1 is a schematic side view of an embodiment of a sea-land-sky craft of an elliptical cylinder rotor type according to the present invention.
Figure 2:
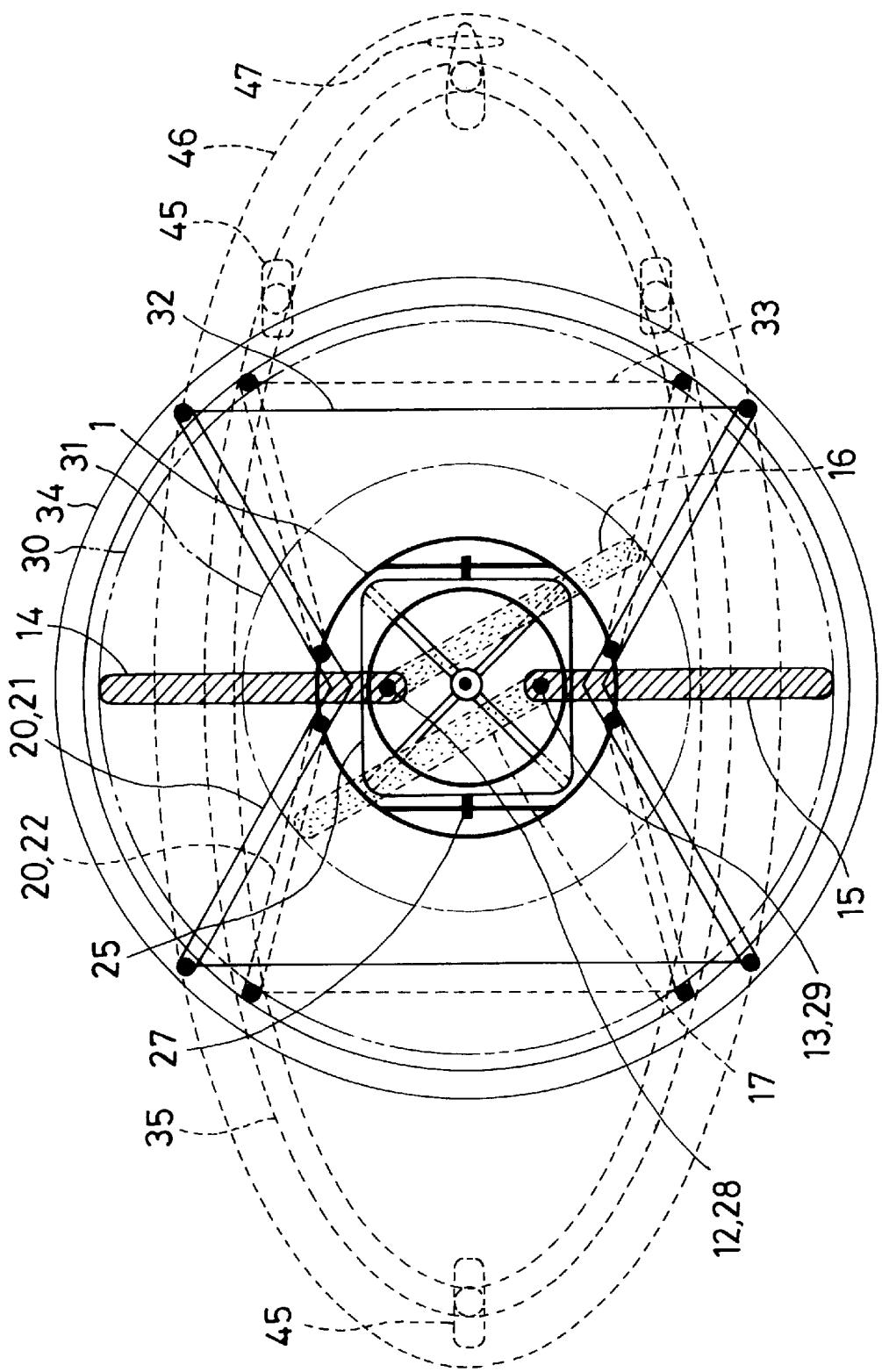
FIG. 2 is a schematic plan view of the sea-land-sky craft of FIG. 1.
Figure 3:
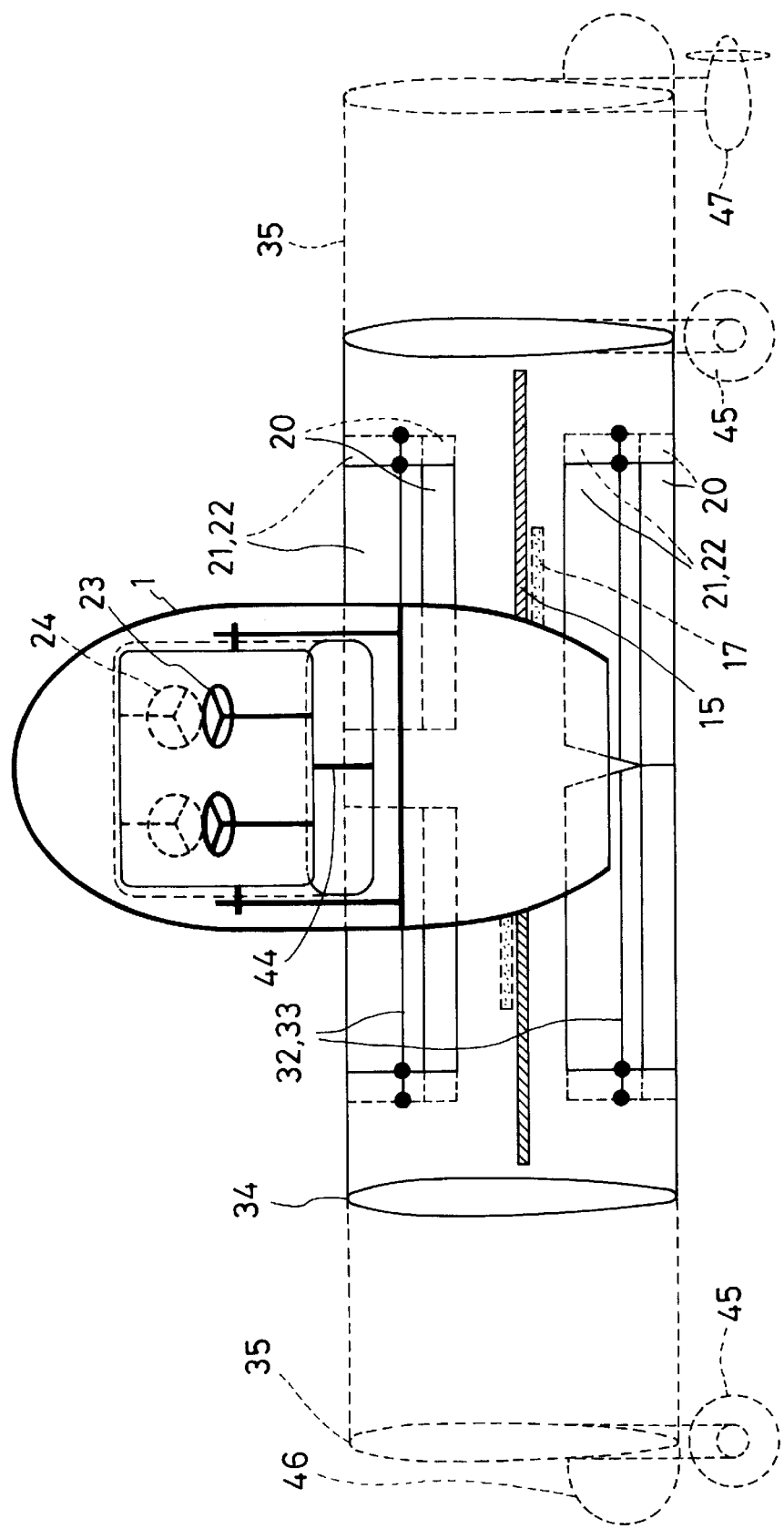
FIG. 3 is a schematic front view of the sea-land-sky craft of FIG. 1.

An embodiment of the invention will be described in detail with reference to the accompanying drawings. In FIGS. 1 to 3, the drive forces of main motors 2 and 3 mounted on a fuselage 1 are transmitted through centrifugal clutches 4 and 5, bevel pinions 6 and 7, bevel gears 8 and 9, bevel gear shafts 10 and 11 and rotor mounting shafts 12 and 13 to dual counter-rotating wings 14 and 15.

As the dual counter-rotating wings 14 and 15 rotate, there is established a downward draft 18, in reaction to which an upward lift 19 is generated. Like the helicopter of the prior art, therefore, the sea-land-sky craft of the invention is floated to take off by that lift 19. At this time, the swirling components are eliminated from the downward draft 18 unlike the rotor of unidirectional rotations by the swirl offsetting action of the dual counter-rotating wings 14 and 15 rotating in opposite directions.

Therefore, there are required neither the tail boom extending long backward nor the tail rotor located at the trailing end of the boom, although indispensable in the helicopter of the prior art for canceling the unidirectional rotations of the main rotor and the horizontal turn (or yawing) of the fuselage caused by the accompanying swirling flows. Thus, the fuselage 1 of the sea-land-sky craft of the invention can be made far smaller and lighter than the long and large one of the helicopter of the prior art.

Here in the sea-land-sky craft of the invention, a strut device 21 having a control rotor 20 always exists in the flow of the downward draft 18 established by the rotor so that the affections of the swirling flow, if any, can be easily canceled by the actions of the control rotor 20. Therefore, the sea-land-sky craft of the invention can also be embodied by a single rotor of unidirectional rotations.

By the effect of a cylindrical duct 34 disposed at the outer circumferences of the rotors 14 and 15 and having a wing-shape profile section, moreover, the magnitude of the lift to a driving force is 1.4 times as large as or more than that with no duct (see p. 90 of Lectures of Asahi Aeronautical University, Feb. 15, 1964).

Therefore, the vertical climbing efficiency of the sea-land-sky craft of the invention is 1.4 times as high as or more than that of the helicopter of the prior art, and the driving force needed for the main motors 2 and 3 may naturally be 1/1.4 or less.

When the sea-land-sky craft of the invention climbs to a predetermined horizontal flying altitude, the pilot controls the control wing 20 with a control stick 23 to incline the attitude of the fuselage 1 gradually forward until the planes of rotation of the rotors 14 and 15 which had been rotating horizontally become vertical. From now on, the controls of the control stick 23 may be continued like the ordinary aircraft having fixed wings of the prior art so that the sea-land-sky craft may maintain horizontal flight at the predetermined altitude.

At this time, a seat 25 is so inclined backward by 90 degrees to the orientation of seat 26 on a vertical seat turning pin 27 in the direction opposed to the change in the inclination of the fuselage 1 that the pilot may take an attitude suited for the horizontal flying direction. In the sea-land-sky craft of the invention, the vertical seat turning pin 27 is centered at a position higher than that of the center of gravity of the seat occupied by the pilot, so that the seat 25 is always turned following the gravitational force of the earth up to the seat orientation 26.

In the sea-land-sky craft is to be shifted to the horizontal flight, the rotors 14 and 15 are turned, while continuing their rotations, to positions 16 and 17, respectively, to reduce their outer diameters of rotation from 30 to 31, and the angles of incidence of the rotors 16 and 17 are also changed from the set value for the vertical flight to the set value for the horizontal flight. After this, the length of a strut turning wire 32 is shortened to a length 33 to turn the strut device 21 to a position 22, so that the cylindrical duct 34 is deformed into an elliptic cylinder wing 35 for horizontal flight (corresponding to double wings of the type wherein the wings are joined at wing-ends).

Figure 4:
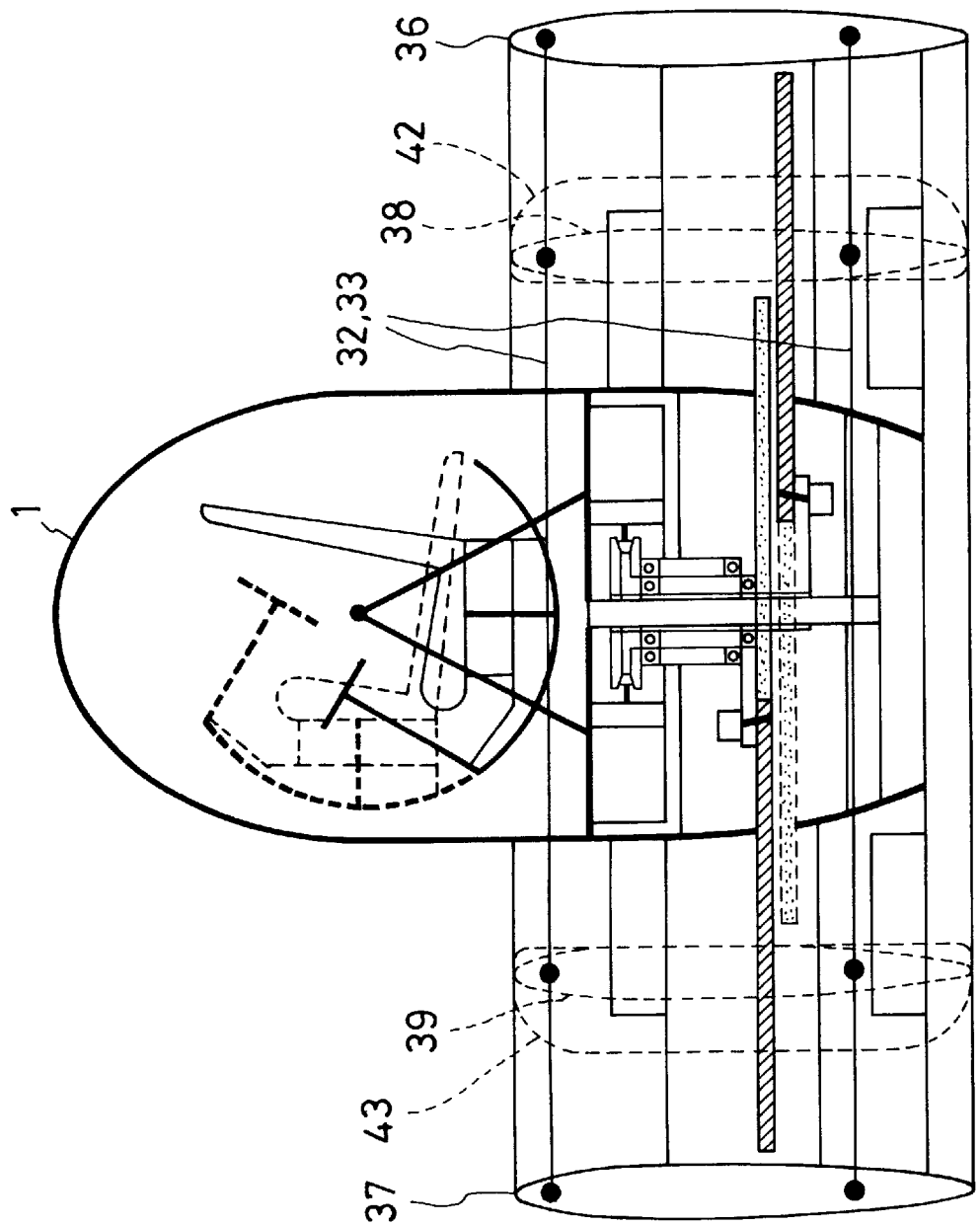
FIG. 4 is a schematic side view of an embodiment of a sea-land-sky craft of a parallel dual rotor type according to the present invention.
Figure 5:
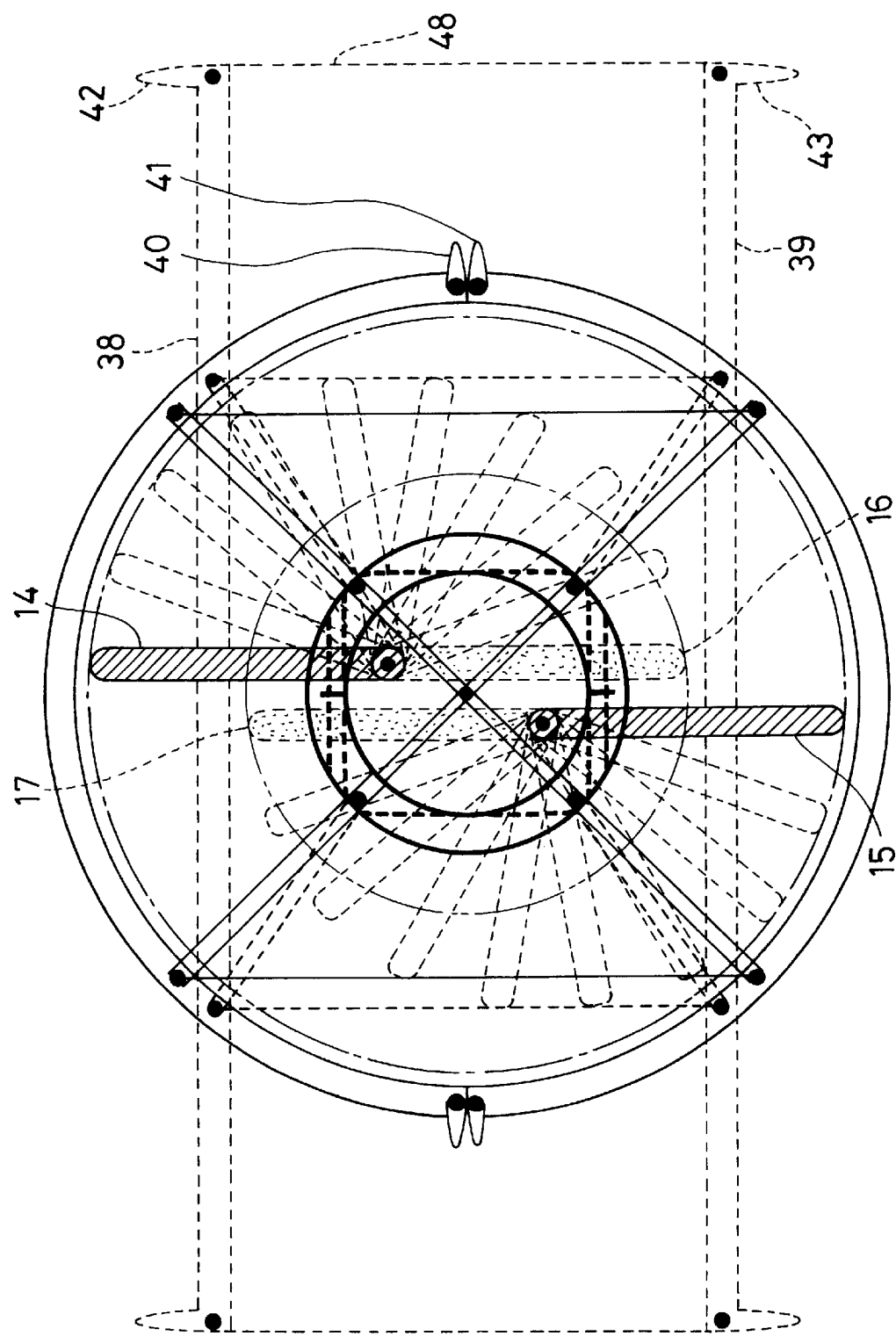
FIG. 5 is a schematic plan view of the sea-land-sky craft of FIG. 4.
Figure 6:
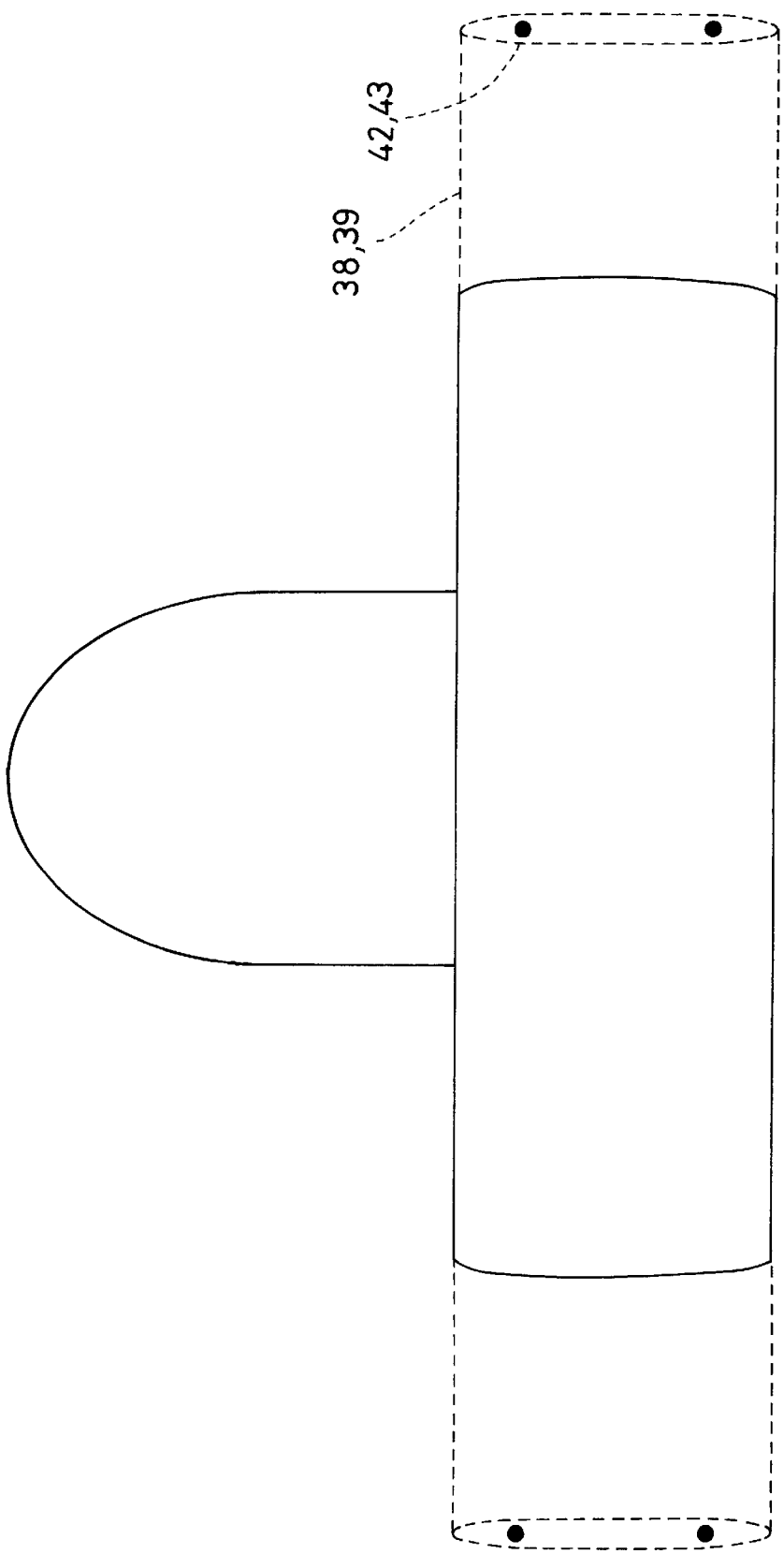
FIG. 6 is a schematic front view of the sea-land-sky craft of FIG. 4.

In the deformation of the cylindrical duct, as shown in FIGS. 4 to 6, split type cylindrical ducts 36 and 37 are halved into straight wings 38 and 39 of an ordinary double wing plane style. In another deformation, a cylindrical duct is cut off at one portion and extended into a single straight wing. The remaining reference numerals designate the same portions as those of FIGS. 1 to 3.

In the aforementioned deformations into the style of the fixed-wing aircraft, the lift to drag ratio (i.e., lift/drag) of the sea-land-sky craft of the invention is improved to 10 to 20 (page 80 of Lecture of Asahi Aeronautical University ibid.), although that of the case of the helicopter of the prior art in horizontal flight is 3 to 5 at most. As a result, the lift/drag ratio of the sea-land-sky craft of the invention is improved several times greater than that of the helicopter so that the horizontal flight efficiency of the sea-land-sky craft of the invention is improved to match that of the fixed-wing aircraft.

Here, the mechanism for turning the rotating wings and the mechanism for changing the angle of incidence of the rotating wings can be realized by causing rotating wing turning mechanisms 28 and 29 to turn the rotating wings 14 and 15 which are rotatably fitted at their ends on the rotating wing mounting shafts 12 and 13 inclined (or tilted) to an extent corresponding to the change in the angle of incidence. The details of the mechanism are omitted because it falls within the scope which can be easily practiced in combination of the existing hydraulic, pneumatic and electric techniques by those skilled in the art.

When the sea-land-sky craft transfers from the horizontal flight to a vertical descent, opposite to the aforementioned transfer from the vertical climb to the horizontal flight, the elliptic cylinder wing 35 is returned to the shape of the cylindrical duct 34, and the rotating wings 16 and 17 are also returned to the shape of the rotating wings 14 and 15. Then, a control stick 24 is operated to raise the fuselage 1 by 90 degrees from the horizontal flight attitude to an upward vertical flight attitude. The driving forces of the main motors 2 and 3 are controlled to adjust the lift so that the sea-land-sky craft descends at a safe downward velocity. If the main motor driving forces are then adjusted to a zero downward velocity, the sea-land-sky craft can keep a hovering state.

At the vertical descent time, the seat 26 is so automatically turned forward on the vertical seat turning pin 27 by 90 degrees to the attitude of the seat 25, so that the pilot can land the sea-land-sky craft safely while watching the landing point in a forward-directed attitude.

Moreover, the system which is adopted in the sea-land-sky craft of the invention is one in which the dual counter rotating wings 14 and 15 are located below the center of gravity of the entire airframe, so that it can retain self-stability of the flight attitude by the gyro effect of the rotating portions. Therefore, the flight attitude is not unstable as in the helicopter or VTOL of the prior art, so that a complicated precise control device such as an automatic attitude stabilizing system is not needed at all although it is essential to the helicopter or VTOL of recent years.

Here will be described an example of the ground running. After the sea-land-sky craft was completely landed by lowering electric running wheels 45, the rotating wings 14 and 15 are brought into the horizontal flying states 16 and 17, and the outer diameter of rotation is reduced from the diameter 30 to the diameter 31 and the duct 34 is deformed into the elliptic cylinder wing 35. After this, the main motors 2 and 3 are controlled to a low speed to release the centrifugal clutches 4 and 5. The seat 25 is horizontally turned by 90 degrees on a horizontal seat turning pin 44 to allow the pilot to face in the running direction and to drive the sea-land-sky craft in the target direction with the running wheels 45 and the control stick 23. For a running on the water, the sea-land-sky craft is provided with an airbag type float 46 on the outer periphery of the lower portion of the elliptic cylinder wing 35. As at the ground running time, an electric propeller 47 is inserted into the water when the sea-land-sky craft alights on the water, and the control stick 23 is operated to change the direction of the propeller 47 so that the sea-land-sky craft can navigate in the target direction.

Here, the definitions of claims 4 and 5 are made for securing the safety while the sea-land-sky craft of the invention is flying, running and navigating, and for making it as easy as possible to handle and control the sea-land-sky craft in action so that anyone can maneuver the craft simply (although neither shown nor detailed).

As appreciated from the above, the present invention provides the novel sea-land-sky craft which can not only eliminate all the defects of the helicopter or VTOL of the prior art but also has a number of features not found in the helicopter or VTOL of the prior art and which can perform the various types of flight including the vertical, horizontal and hovering flights, the ground running and the water navigation safely and easily. The invention has the following effects.

The sea-land-sky craft can lift a high load vertically with a low power and can fly a long distance at a high speed with a low power so that it has a high economical effect as the traffic transportation means for the next generation.

The sea-land-sky craft can take off and land on a ground or water such as a narrow unoccupied land or a swimming pool, so that it can be exploited as the traffic transportation means between remote and secluded places in the mountains or between solitary islands, which have been unmanned and not used till now, and can become effective means to deal with the worldwide population explosion now at issue.

The sea-land-sky craft is low not only in the initial purchasing cost but also in the maintaining and running cost, so that its applications to new kinds of sports or new kinds of manned/unmanned works in the air can be developed one after another.

Without the complicated precise flight attitude control system which will easily get out of order, the sea-land-sky craft can fly more safely and comfortably than the automobile so that it can easily spread in use over the world including the developing countries.

The sea-land-sky craft can be used in the world as the universal means of transportation capable of running/navigating on a narrow road/waterway and can do various kinds and manners of works without an operator if there is mounted a remote maneuvering device or a course setting system using the car navigation system and a camera device.

What is claimed is:

1. A sea-land-sky craft comprising: rotating wings rotatable in opposite directions on their centers; mounting shafts disposed at positions eccentric to the centers of said rotating wings and mounting said rotating wings so that the orientation of the rotating wings can be turned; a cylindrical duct enclosing the outer circumferences of the maximum diameters of the rotations of said rotating wings; a fuselage located at a central portion of said craft; and movable struts for connecting said cylindrical duct and said fuselage, wherein said cylindrical duct is deformed into a fixed wing by the actions of said movable struts.

2. A sea-land-sky craft according to claim 1, further comprising: a vertical seat turning pin and a horizontal seat turning pin disposed respectively over and below the center of gravity of the seat including the weight of the crew.

3. A sea-land-sky craft according to claim 1, further comprising: land running wheels and a water navigation propelling device below said cylindrical duct and/or said fuselage.

4. A sea-land-sky craft according to claim 1,
wherein said fuselage or said cylindrical duct includes:
a slow descent maneuvering device of a parachute or paraglider type; and a shock absorbing soft ground/water landing device and float of an airbag type.

5. A sea-land-sky craft according to claim 1, further comprising: an automatic maneuvering device activated in response to signals from space (including artificial satellites), the sky, underground, above water and underwater.

* * * * *